(12) United States Patent
Pernstich et al.

(10) Patent No.: US 7,246,956 B2
(45) Date of Patent: Jul. 24, 2007

(54) APPARATUS FOR FASTENING A CAMERA TO AN OBSERVATION TELESCOPE

(75) Inventors: Ludwig Pernstich, Rum/Innsbruck (AT); Helmut Wiedermann, Pill (AT)

(73) Assignee: Swarovski Optik K.G. (AT)

( * ) Notice: Subject to any disclaimer, the term of this patent is extended or adjusted under 35 U.S.C. 154(b) by 86 days.

(21) Appl. No.: 10/846,161

(22) Filed: May 14, 2004

(65) Prior Publication Data

US 2005/0078956 A1  Apr. 14, 2005

(30) Foreign Application Priority Data

May 14, 2003   (EP) .................................. 03010806

(51) Int. Cl.
*G03B 17/00*   (2006.01)
(52) U.S. Cl. ...................................... 396/428; 396/432
(58) Field of Classification Search ................ 396/428, 396/432; D16/132; 348/373, 375
See application file for complete search history.

(56) References Cited

U.S. PATENT DOCUMENTS

| | | | | |
|---|---|---|---|---|
| 3,399,612 A | * | 9/1968 | Korte | .......................... 396/432 |
| 5,548,876 A | * | 8/1996 | Oetiker | ......................... 24/271 |
| 6,357,937 B1 | * | 3/2002 | Stratton, Jr. | ................. 396/428 |
| 6,717,727 B2 | * | 4/2004 | Barziza | ....................... 359/399 |
| 2002/0197075 A1 | * | 12/2002 | Crockett | ..................... 396/429 |

* cited by examiner

*Primary Examiner*—W. B. Perkey
*Assistant Examiner*—Rishi S. Suthar
(74) *Attorney, Agent, or Firm*—Andrus, Sceales, Starke & Sawall, LLP

(57) ABSTRACT

A camera (2) swivels on an observation telescope (1) between a shooting position in which the optical axis (6) of the camera objective (8) extends in the direction of the optical axis (7) of the telescope eyepiece (5) and an observation position in which the target is observable through the telescope eyepiece (5), by being fastened to a swivel arm (3) linked to the observation telescope (1) whereby the optical axes (6, 7) of the camera objective (8) and the telescope eyepiece (5) form an angle (α) in the observation position.

22 Claims, 3 Drawing Sheets

APPARATUS FOR FASTENING A CAMERA TO AN OBSERVATION TELESCOPE

This invention relates to an apparatus for fastening a photographic camera, camcorder or similar camera to an observation telescope whereby the optical axis of the camera objective extends coaxially to the optical axis of the telescope eyepiece in the shooting position.

Observation telescopes can be used as objectives with great focal distance and thus high magnification for photographic cameras, camcorders and similar cameras.

Since observation telescopes do not have any connection for a camera, an adapter is used for fastening the camera to the telescope. The adapter can be formed as a forked clamping apparatus fastened to the tripod thread of the camera and capable of being slipped onto the eyepiece of the observation telescope. If the eyepiece of the telescope has an unscrewable cup, the adapter can have a thread which is screwed onto the fastening thread of the cup, and a second thread with which the adapter is fastened to the filter thread of the camera objective.

The clamping apparatus to be fastened to the eyepiece requires new time-consuming adjustment every time the camera has been removed from the observation telescope. Also, the clamping apparatus can usually be fastened only to the zoom ring in the case of zoom eyepieces, so that zooming is no longer possible when photographing. Moreover, the fastening of the clamping apparatus to the eyepiece is quite unstable and thus quite sensitive to shocks, which can impair the image quality. Because of the unstable fastening to the observation telescope, the camera must furthermore be removed every time the observation location is changed with the observation telescope.

If the camera is fastened to a thread of the cup, the camera must be unscrewed each time for observation and the cup screwed on again each time. Also, the camera cannot be adjusted to the observation telescope and therefore every camera requires its own adapter.

If the adapter is fastened to the filter thread of the camera, there is a danger of the camera being damaged because the filter thread is not designed to carry the total weight of the camera. Because of this unstable fastening the camera must be removed every time the observation location is changed with the observation telescope. With zoom objectives, no fastening is possible because the objective moves during zooming.

Moreover, many cameras do not have a filter thread. Also, each camera requires its own adapter. Thus, instead of the filter thread a separate thread can be provided for fastening the adapter to the camera housing. However, this thread is only present in few cameras.

DE-A-33 33 425 discloses an apparatus for fastening a camera to the aiming telescope of a weapon which has for this purpose a mount to which the camera is fastened with a fitting so as to swivel around a ball-and-socket joint. The fitting is provided with a semitransparent mirror so that the pencil of rays leaving the aiming telescope eyepiece is split up into a partial pencil that falls into the eye of the observer while the other partial pencil is deflected perpendicular to the camera.

The problem of the invention is to provide an apparatus for fastening a camera to an observation telescope which permits quick and uncomplicated mounting and dismounting of the camera, can be used for cameras of different overall sizes, and permits simple and exact adjustment of the optical axis of the camera to the optical axis of the eyepiece of the observation telescope as well as a simple change between observation through the observation telescope and photographing or filming with the camera.

This is achieved according to the invention with the apparatus characterized in claim 1. Advantageous embodiments of the inventive apparatus are stated in the subclaims.

In the inventive apparatus the camera is linked to the observation telescope with a swivel arm so as to swivel between a shooting position for photographing or filming and an observation position in which the target is observable through the telescope eyepiece. The optical axis of the camera objective extends in the direction of the optical axis of the telescope eyepiece in the shooting position. That is, the optical axis of the camera objective and the optical axis of the telescope eyepiece are disposed coaxially to each other in the shooting position. However, in the observation position the camera is swiveled out of the axis of the telescope eyepiece, causing the optical axes of the camera objective and telescope eyepiece to form an angle.

The inventive apparatus permits a quick change between observation, on the one hand, and photographing or filming, on the other hand, without influencing the adjustment between camera and observation telescope. The inventive apparatus is suitable for cameras of different dimensions. The camera can be a photographic camera, a digital camera, a camcorder or the like.

The swivel arm is preferably linked to the eyepiece or base member of the observation telescope. Thus the magnification adjustment is not impaired in the case of zoom eyepieces, since only a narrow area of the eyepiece is needed, or fastening can be effected only on the observation telescope.

The swivel arm is preferably mounted on the observation telescope so as to swivel around a horizontal axis. Observation telescopes are mounted on tripod heads. The latter permit swiveling around the horizontal and vertical axes. Optimal mobility of said swiveling is obtained when the center of gravity of the observation telescope is located as close as possible to the swivel axis of the tripod head. The swivel ability of the swivel arm around a horizontal axis permits the camera to be swiveled upward beyond the observation telescope. This makes the difference relatively small between the center of gravity of the observation telescope without the camera and the center of gravity of the observation telescope with the camera swiveled into the observation position.

The swivel arm is preferably linked to a ring firmly embracing the eyepiece or the base member of the observation telescope. On the other hand, the camera is fastened to the swivel arm preferably with a screw to be screwed into the tripod thread of the camera. This ensures simple and stable mounting of the camera on the observation telescope. The stable construction avoids vibrations and thus produces constant optical quality. Moreover, the stable construction permits the camera to remain on the observation telescope upon a change of location.

The ring to which the swivel arm is linked is preferably fastened detachably to the eyepiece or base member of the observation telescope. For this purpose it is preferably formed as a clamping ring. The clamping ring can be fastened to the eyepiece or base member with a clamping lever, clamping screw or similar clamping device. The swivel arm can have an extension which, in the shooting position, is supported on the ring or clamping ring fastened to the eyepiece or base member of the observation telescope. This achieves additional stability. To this end the swivel arm can also be formed as a stirrup encompassing the eyepiece and/or the base member of the observation telescope. Moreover, a detent and/or clamping of the swivel arm in the two end positions, that is, the shooting position and the observation position, can be provided to facilitate common transport of the observation telescope with the camera mounted.

For adjusting the optical axis of the camera objective to the optical axis of the telescope eyepiece, the camera is mounted on the swivel arm preferably so as to be displaceable around three axes disposed perpendicular to each other. For displaceably mounting the camera around the three axes, a first slide to be fastened to the camera and displaced at right angles to the optical axis of the camera objective, a second slide displaceable parallel to the optical axis of the camera objective and having the first slide displaceably mounted thereon, and a third slide displaceable perpendicular to the first slide on the swivel arm and having the second slide displaceably mounted thereon can be provided.

This ensures simple adjustment of the optical axes to each other since adjusting motions can be carried out in all directions independently of each other. Since the adjustment remains unchanged once it is performed, constant quality of the photos is ensured. For fixing the camera position once it is adjusted with the slides, fixable stops are preferably provided. The first slide can be fastened to the camera with the screw to be screwed into the camera tripod thread. The first slide can be mounted on the second slide with a longitudinal track, e.g. dovetail way. A dovetail way can also be provided for mounting the third slide on the swivel arm.

For finely adjusting the optical axis of the camera to the optical axis of the telescope eyepiece, a setscrew can be provided with which the swivel arm is supported on the ring or clamping ring at a distance from the horizontal swivel axis thereof.

It is also possible to integrate the optical system into the ring to which the swivel arm is linked in order to obtain optimal coordination between observation telescope and camera.

Hereinafter an embodiment of the inventive apparatus will be explained in more detail by way of example with reference to the perspective drawings, in which.

Figure 1:
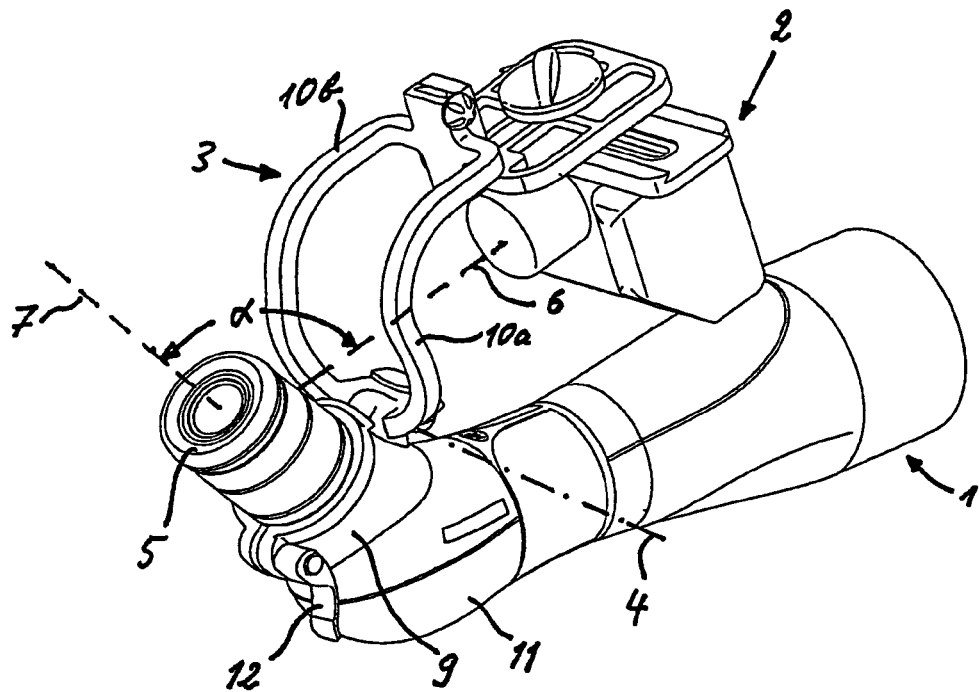
FIG. 1 shows an observation telescope with the camera fastened thereto in the observation position.
Figure 2:
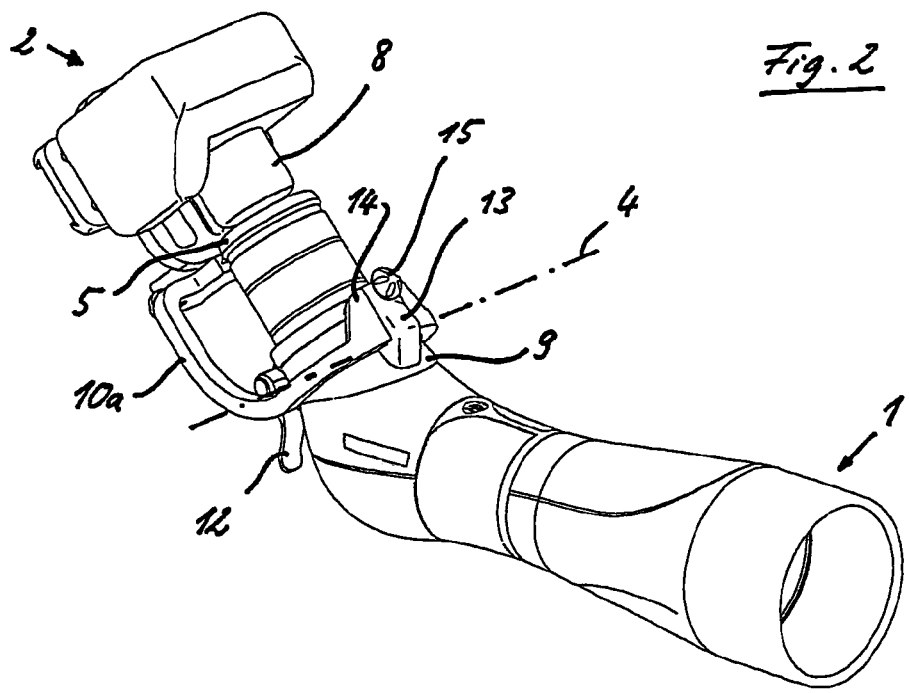
FIG. 2 shows a part of the observation telescope with the camera in the shooting position.
Figure 3:
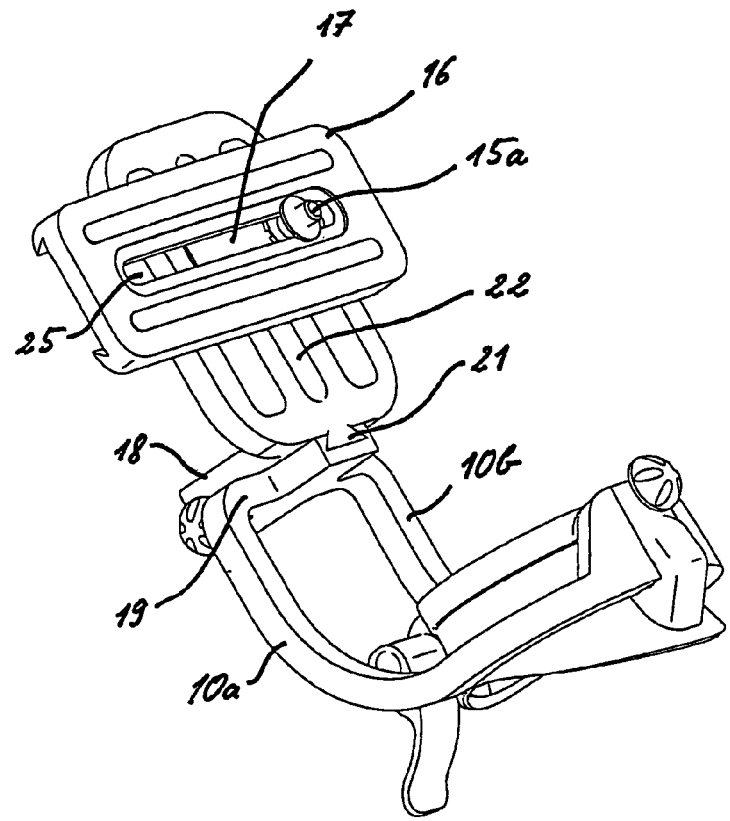
FIGS. 3 and 4 show the fastening apparatus from above and from the side.
Figure 4:
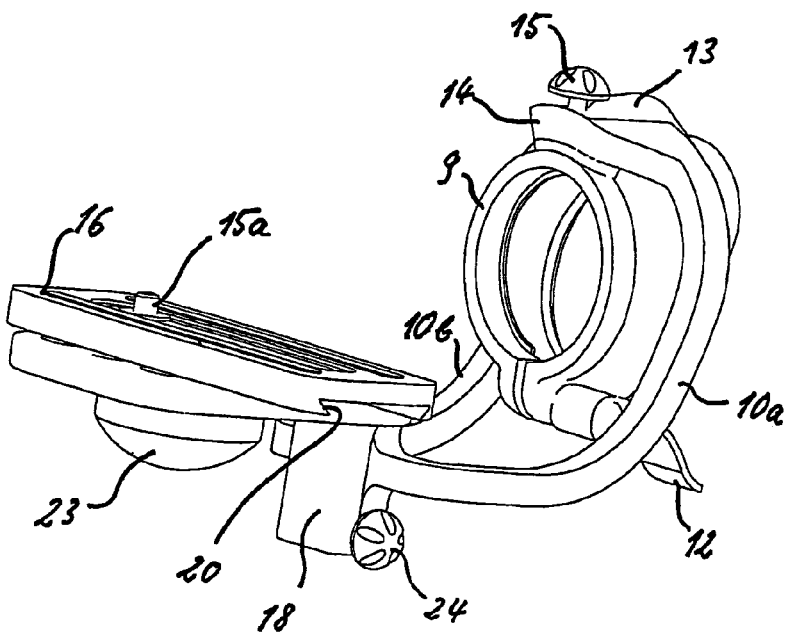
Figure 5:
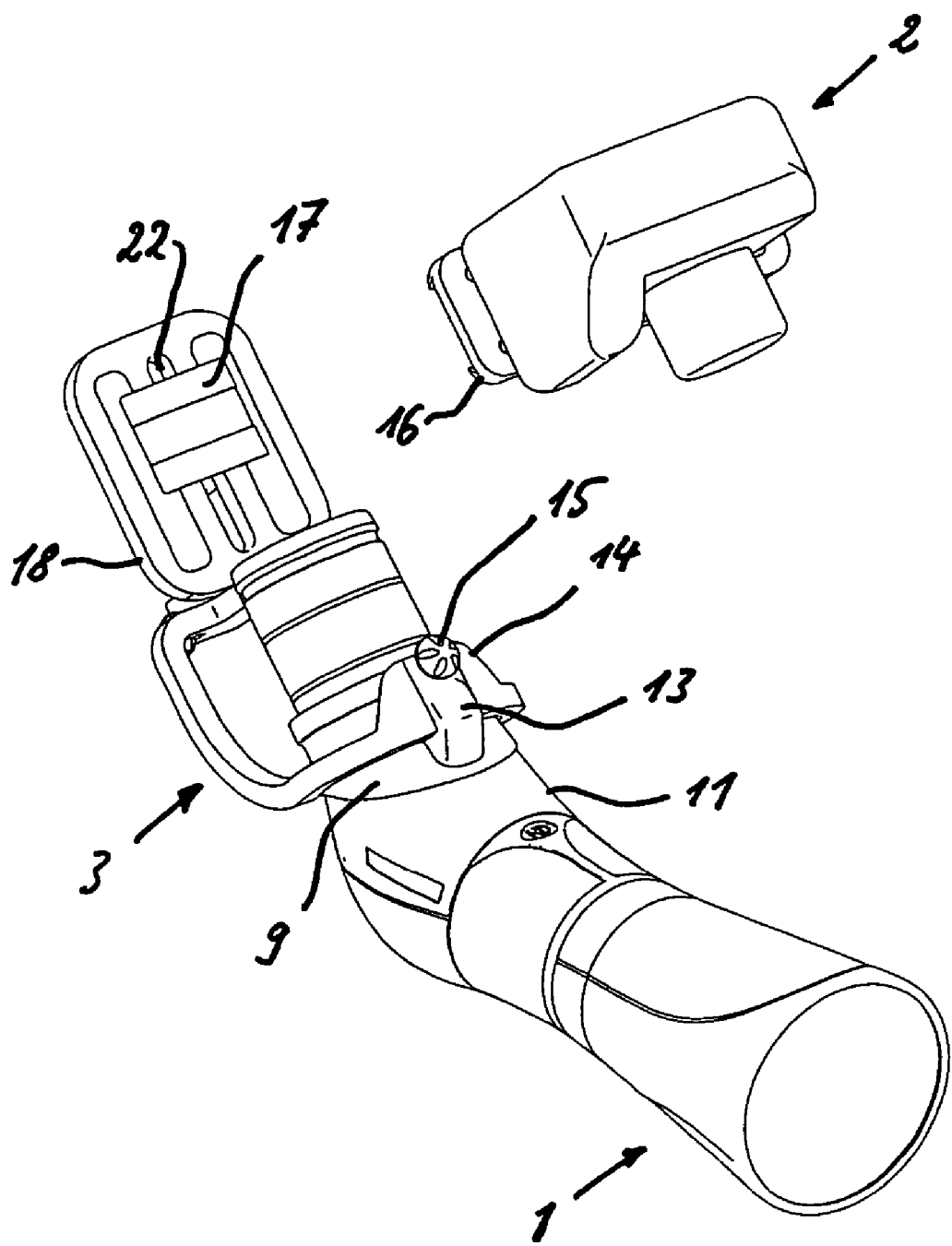
FIG. 5 shows a part of the observation telescope with the fastening apparatus fastened thereto whereby the first slide is fastened to the removed camera.

According to FIGS. 1 and 2, a photographic camera 2 is fastened to an observation telescope 1 with a swivel arm 3. The swivel arm 3 is for this purpose mounted on the observation telescope 1 so as to swivel around an axis 4 on the observation telescope 1 which extends horizontally and at right angles to the observation telescope 1. Thus the camera 2 can be swiveled out of the observation position according to FIG. 1, in which the eyepiece 5 of the observation telescope 1 is free for observing the target, into the shooting position according to FIG. 2, in which the camera 2 can be used for photographing.

While the optical axes 6 and 7 of the objective 8 of the camera 2 and the eyepiece 5 extend in the same direction, i.e. are disposed coaxially, in the shooting position according to FIG. 2, they form an angle α in the observation position according to FIG. 1.

The swivel arm 3 is linked to a clamping ring 9 fastened to the base member 111 of the observation telescope 1, to be more precise immediately beside the eyepiece 5. The clamping ring 9 has a clamping lever 12. for clamping it to the base member 11.

The swivel arm 3 is formed as a stirrup which encompasses the clamping ring 9 at the top and both sides with two arms 10a, 10b in the shooting position (FIG. 2). The swivel axis 4 is provided on a projection 13 at the top on the clamping ring 9. The stirrup-shaped swivel arm 3 has an extension 14 extending from the swivel axis 4 in the direction of the camera 2, and penetrated by a setscrew 15 supported on the ring 9. This permits fine adjustment of the optical axis 6 of the camera objective 8 to the optical axis 7 of the telescope eyepiece 5 in the shooting position according to FIG. 2.

For adjusting the optical axis 6 of the camera objective 8 to the optical axis 7 of the telescope eyepiece 5, the camera 2 is mounted on the swivel arm 3 around three axes x, y, z disposed perpendicular to each other.

For this purpose a first slide 16 is provided to which the camera 2 is fastened with a screw 15 which engages the tripod thread of the camera 2. The first slide 16 is mounted in the x direction, i.e. in the shooting position at right angles to the optical axis 6 of the camera objective 8, on a second slide 17. The second slide 17 is mounted in the y direction, i.e. in the shooting position in the direction of the optical axis 6 of the camera objective 8, displaceably on a third slide 18, which is mounted in the z direction displaceably on the swivel arm 3, at the place where the two arms 10a, 10b are connected by a bar 19 extending under the telescope eyepiece 5.

For displaceable mounting of the first slide 16 on the second slide 17 and of the third slide 18 on the swivel arm 3 or bar 19, a dovetail way 20, 21 is provided in each case. Further, the third slide 18 has a guide slot 22 to be able to displace the second slide 17 parallel to the optical axis of the camera objective 8 in the shooting position.

For fixing the second slide 17 to the third slide 18 a clamping knob 23 is provided, and for fixing the third slide 18 to the swivel arm 3 a clamping knob 24.

Further, the first slide 16 has a longitudinal slot 25 through which the fastening screw 15a protrudes to position the optical axis 7 of the camera objective 8 in the longitudinal direction of the first slide 16.

The invention claimed is:

1. An apparatus for fastening a photographic camera, camcorder or similar camera to an observation telescope, the camera having an objective and the observation telescope having an eyepiece and a base member, the apparatus comprising:

a swivel arm attaching the camera to the base member of the observation telescope such that the eyepiece can be exchanged without detaching the swivel arm from the observation telescope;

wherein the swivel arm facilitates relative movement of the camera and observation telescope between a shooting position wherein the optical axis of the camera objective extends in the direction of the optical axis of the observation telescope eyepiece, and an observation position wherein a target is observable through the observation telescope eyepiece;

wherein the optical axes of the camera objective and the observation telescope eyepiece form an angle in the observation position;

wherein the swivel arm is mounted on the observation telescope so as to swivel around a swivel axis extending horizontally and transverse to both the optical axes of the camera and the observation telescope;

wherein the camera is mounted and adjustable on the swivel arm around three axes (x, y, z) disposed perpendicular to each other for adjustment of the optical axis of the camera objective to the optical axis of the observation telescope eyepiece; and wherein a first slide to be fastened to the camera and displaceable at right angles to the optical axis of the camera objective, a second slide displaceable parallel to the optical axis of the camera objective and having the first slide mounted displaceably thereon, and a third slide mounted displaceably perpendicular to the first slide on the swivel arm and having the second slide mounted displaceably thereon are provided for displaceable mounting of the camera around the three axes (x, y, z).

2. An apparatus according to claim 1, wherein the swivel arm is linked to a ring that is fastened to the base member.

3. An apparatus according to claim 2, wherein the ring comprises a clamping ring.

4. An apparatus according to claim 3, wherein the clamping ring is fastened with a clamping lever.

5. An apparatus according to claim 2, wherein the swivel arm has an extension which is supported on the ring in the shooting position.

6. An apparatus according to claim 5, wherein a setscrew is provided on the extension for fine adjustment of the optical axis of the camera objective to the optical axis of the observation telescope eyepiece.

7. An apparatus according to claim 1, wherein the swivel arm comprises a stirrup which encompasses the base member of the observation telescope with two arms.

8. An apparatus according to claim 1, wherein the camera is fastened to the swivel arm with a screw to be screwed into a tripod thread of the camera.

9. An apparatus according to claim 1, wherein the first slide is to be fastened to the camera with a screw to be screwed into a camera tripod thread.

10. An apparatus according to claim 9, wherein a first slide has a longitudinal slot through which the screw protrudes for positioning the optical axis of the camera objective in the longitudinal direction of the first slide.

11. An apparatus according to claim 1, wherein at least one of the first slide and the third slide is mounted on at least one of the second slide and the swivel arm with a dovetail way.

12. An apparatus according to claim 1, wherein the third slide has a guide slot for the second slide displaceable parallel to the optical axis of the camera objective.

13. An apparatus according to claim 1, wherein a clamping device is provided for fixing the second slide to the third slide and/or for fixing the third slide to the swivel arm.

14. An apparatus according to claim 1, further comprising fixable stops for fixing the camera once it is adjusted with the slides.

15. An apparatus according to claim 1, wherein the swivel arm is fixedly attached to the observation telescope and camera such that the respective optical axes of the camera objective and the observation telescope remain in alignment each time the camera is swiveled into the shooting position.

16. An apparatus for fastening a photographic camera, camcorder or similar camera to an observation telescope, the camera having an objective and the observation telescope having an eyepiece and a base member, the apparatus comprising:

a swivel arm attaching the camera to the base member of the observation telescope such that the eyepiece can be exchanged without detaching the swivel arm from the observation telescope;

wherein the swivel arm facilitates relative movement of the camera and observation telescope between a shooting position wherein the optical axis of the camera objective extends in the direction of the optical axis of the observation telescope eyepiece, and an observation position wherein a target is observable through the observation telescope eyepiece;

wherein the optical axes of the camera objective and the observation telescope eyepiece form an angle in the observation position;

wherein the camera is mounted and adjustable on the swivel arm around three axes (x, y, z) disposed perpendicular to each other for adjustment of the optical axis of the camera objective to the optical axis of the observation telescope eyepiece; and wherein a first slide to be fastened to the camera and displaceable at right angles to the optical axis of the camera objective, a second slide displaceable parallel to the optical axis of the camera objective and having the first slide mounted displaceably thereon, and a third slide mounted displaceably perpendicular to the first slide on the swivel arm and having the second slide mounted displaceably thereon are provided for displaceable mounting of the camera around the three axes (x, y, z).

17. An apparatus according to claim 16, wherein the first slide is to be fastened to the camera with a screw to be screwed into a camera tripod thread.

18. An apparatus according to claim 17, wherein a first slide has a longitudinal slot through which the screw protrudes for positioning the optical axis of the camera objective in the longitudinal direction of the first slide.

19. An apparatus according to claim 16, wherein at least one of the first slide and the third slide is mounted on at least one of the second slide and the swivel arm with a dovetail way.

20. An apparatus according to claim 16, wherein the third slide has a guide slot for the second slide displaceable parallel to the optical axis of the camera objective.

21. An apparatus according to claim 16, wherein a clamping device is provided for fixing the second slide to the third slide and/or for fixing the third slide to the swivel arm.

22. An apparatus according to claim 16, further comprising fixable stops for fixing the camera once it is adjusted with the slides.

* * * * *